Nov. 17, 1925.  G. P. STEGNER  1,562,129
HORSE COLLAR PAD
Filed May 28, 1925
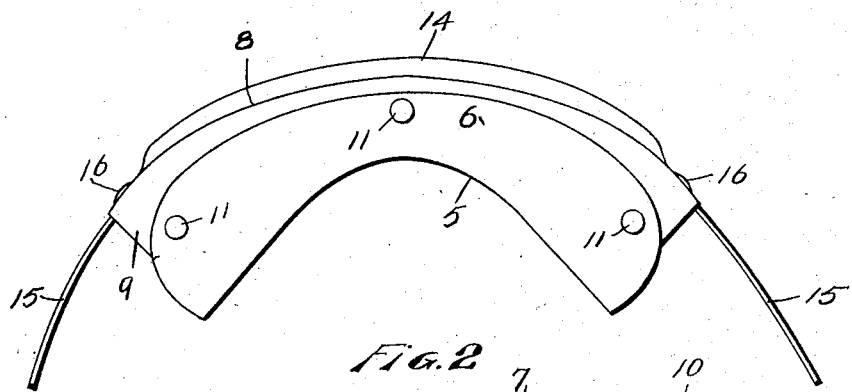
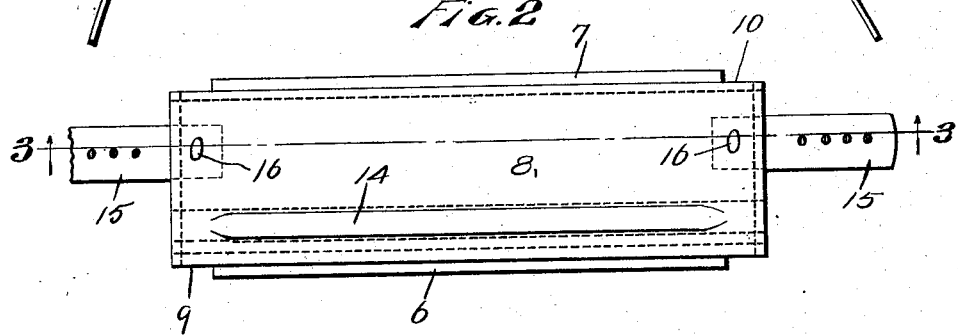
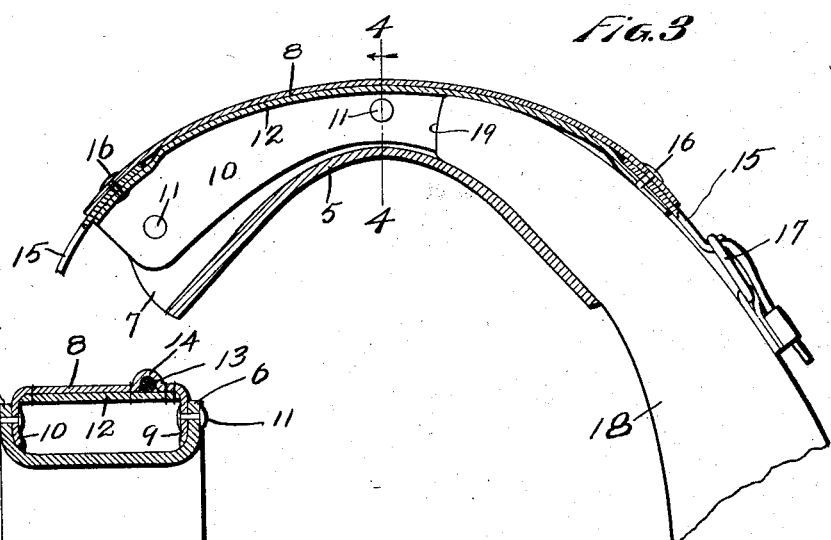
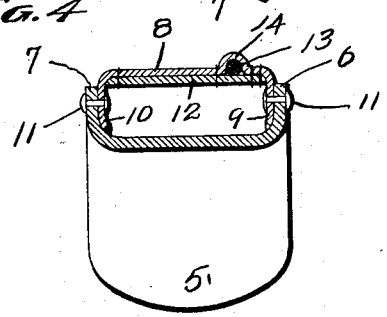
INVENTOR
GEORGE P. STEGNER
By Edward E. Logan
ATTY.

Patented Nov. 17, 1925.

1,562,129

UNITED STATES PATENT OFFICE.

GEORGE P. STEGNER, OF CALIFORNIA, MISSOURI, ASSIGNOR TO WILLIAM HECK SADDLERY COMPANY, OF CALIFORNIA, MISSOURI, A CORPORATION OF MISSOURI.

HORSE-COLLAR PAD.

Application filed May 28, 1925. Serial No. 33,342.

*To all whom it may concern:*

Be it known that I, GEORGE P. STEGNER, a citizen of the United States, residing at California, in the county of Moniteau and State of Missouri, have invented certain new and useful Improvements in Horse-Collar Pads, of which the following is a specification.

My invention relates to improvements in horse collar pads and has for its primary object a pad in which all possibility of breaking down, and the consequent chafing of the horse's neck, is eliminated.

A further object is to construct a horse collar pad in which the side walls are reinforced so that the free ends of the horse collar are prevented from working forward and backward and breaking down the side walls of the pad. I have found that in pads, as at present constructed, the side walls break down very quickly and chafe the horse's neck, causing sore spots. This has been due to the fact that the pad absorbs sweat from the horse and becomes softened. The ends of the collar are merely held in position by means of a strap, which permits them to work backward and forward and in a short time breaks down the side walls of the pad. Then when the harness is hung away over night, the pad stiffens in the broken-down position and, when again used, chafes and digs into the horse's neck, causing sores and preventing the horse from being worked regularly.

In the drawings:

Fig. 1 is a side elevation of my device;

Fig. 2 is a top plan view of the same;

Fig. 3 is a section taken on the line 3—3 of Fig. 2 and showing one end of the collar in position in the pad; and Fig. 4 is a section taken on the line 4—4 of Fig. 3.

In the construction of my device, I employ a bottom member 5, which is preferably arcuate as illustrated in Figs. 1 and 3, and which has its longitudinal edges bent upward so as to form walls 6 and 7, thus forming a member substantially U shaped in cross section. Secured to the member 5 is a top member 8, which is also substantially U shaped in cross section and which is provided with walls 9 and 10. These walls are adapted to fit on the inside of the walls 6 and 7 and are secured thereto by means of rivets or similar fastening means 11. Secured to the underside of the member 8 and between the walls 9 and 10 is a stiffening member 12. Located on the stiffening member and parallel to and adjacent the wall 9 is a filler 13, which is preferably a piece of rope or similar circular flexible material. This filler is located between the stiffening member 12 and the member 8 so as to form a bead 14. The purpose of this bead is to prevent the hame strap from slipping forward off of the pad. Inserted between the members 8 and 12 and at each end of the member 8 is a strap 15. This strap is secured by means of rivets 16 passing through the members 8 and 12 and through the strap, and also by means of stitching, which stitching is also used to secure the members 8 and 12 together. The straps 15 are perforated and are adapted to be secured to buckles 17 carried by the collar 18. In this way the collar is adjustably secured to the pad.

The operation of my device is as follows:—Each end 19 of the collar 18 is inserted in the ends of the pad and the straps 15 secured by means of the buckles 17. When in this position the ends 19 are firmly secured within the pad, which is in the form of a tube open at both ends, the tube having only a single thickness of bottom, a double wall on each side and a stiff top. The purpose of this stiff top is to prevent the ends of the collar from bulging upward and pinching the horse's neck. When the ends of the collar are thus secured within the pad all possibility of their working backward and forward and the consequent breaking down of either of the walls 6 or 7 is prevented for the reason that these walls are reinforced, and there is no possible chance for the ends of the collar to commence breaking down the side walls even after the pad has become well moistened from sweat and consequently no chafing of the horse's neck is possible. While I have shown my device as having only three rivets in the side walls, still it is obvious that more rivets can be employed or, if found desirable, other fastening means between the side walls 6 and 9 and 7 and 10 may be employed without departing from the spirit of my invention.

While I have shown the collar adjustably secured to the pad by means of buckles, still it is obvious that any other fastening means may be employed without departing from the spirit of my invention.

My purpose in adjustably securing the collar to the pad is so that the same collar can be used on various horses, or in other words, the collar be adjustable as to size. For instance a nineteen inch collar will be capable of being adjusted to twenty and twenty-one inches. In this way the necessity of having a large number of different size collars is eliminated, and, as before stated, the same collar can be used for various horses, or, if a collar is used on a young horse, it can be adjusted in size as the animal grows, thus obviating the necessity of buying new collars and discarding a perfectly good collar on account of it being too small.

While I have shown the rib as being formed integral with the tubular member, still it is obvious that the same can be made separately and secured thereto.

I may also, if desired, form the tubular member of a single piece of leather in which event the ordinary collar pad is used and attached by means of straps passing over the tubular member in the same manner that the pads are at present attached to the collar. Furthermore while I have shown the straps 15 secured between the upper portion and the stiffening member, it is obvious that it may be secured either on the top or on the underneath side of the top member, and also in place of using leather straps as shown, webbing chain or similar flexible securing means may be employed.

Having fully described my invention, what I claim is:—

1. A horse collar pad comprising an arcuate tubular member open at both ends only, and having its sides and top reinforced, means located at each end of the top of said member for attaching the same to a horse collar, and means located on the upper surface of said tubular member for holding a hame strap in position.

2. A horse collar pad comprising an arcuate bottom member having its longitudinal edges upturned, a top member having its longitudinal edges downturned, said last mentioned edges adapted to fit snugly within and against the first mentioned edges whereby a tubular member having reinforced side walls is formed, a strap secured to each end of the top member, said straps adapted to secure the pad to a horse collar, and a longitudinally extending outwardly projecting rib formed integral with the top member adjacent one edge thereof.

3. A horse collar pad comprising an arcuate U shaped bottom member, an arcuate U shaped top member, said members adapted to be secured together so as to form an open-ended tube having reinforced walls, a reinforcing strip secured to the top member and between the sides thereof, a strap secured to each end of the top member and having one end thereof located between the top member and the reinforcing member, said straps adapted to secure the pad to a horse collar, and means formed integral with and projecting from the top member for holding a hame strap in position thereon.

In testimony whereof I have affixed my signature.

GEORGE P. STEGNER.